Aug. 30, 1932.    W. H. RUDOLPH    1,874,807
CULINARY DEVICE
Filed July 20, 1931

INVENTOR.
Walter H. Rudolph
BY
Joseph Farley
ATTORNEY.

Patented Aug. 30, 1932

1,874,807

UNITED STATES PATENT OFFICE

WALTER H. RUDOLPH, OF BUFFALO, NEW YORK

CULINARY DEVICE

Application filed July 20, 1931. Serial No. 551,878.

This invention relates to culinary devices and particularly to roasting pans, or the like.

It has been the practice in the past to construct roasting pans of many different shapes and sizes but such pans are usually of oblong cross-section, i. e., longer in one dimension than the other so as to readily contain a fowl to be roasted. Devices of this character are usually provided with handles on the sides or ends thereof to facilitate the lifting and placing of the container within an oven. The handles, however, greatly increase the over-all dimensions of the container and consequently it is difficult, if not impossible, in many cases to make the container set within the ordinary household oven, particularly when the container is of sufficient size to accommodate a large sized fowl.

The principal object of the present invention is to provide a new and improved construction of a roasting pan, or the like, of sufficiently ample dimensions to accommodate a fairly large sized roast or fowl and to provide the same with carrying handles so arranged with respect to the pan that the over-all dimensions thereof will not be increased and, as a result, to secure a device of this character that can readily be accommodated within an oven of a comparatively small household range, or a plurality of roasting pans constructed in accordance with this invention can be arranged within a large oven such as used in hotels or restaurants in a much smaller space than would be occupied by such devices if constructed in the usual manner.

Another important object and advantage of the invention is that as the devices are shipped in individual cartons, much smaller and less expensive cartons may be employed with the devices, when constructed as hereinafter set forth than with the constructions heretofore employed, thus enabling the carton costs to be materially reduced. In addition the use of the smaller cartons permit considerable savings to be effected in freight costs where the freight rates are based on the volume of cubical measurements of the shipment.

Briefly stated, the present invention may be said to consist of a roasting pan, the horizontal cross-sectional configuration of which is of general elliptical shape with the carrying handles thereof so arranged and disposed relatively to the ellipse that the handles bear a definite geometrical relation to the ellipse such as will insure a proper disposition of the handles with respect to the center of gravity of the container and its contents, and also such that the handles will lie within the confines of a parallelepiped circumscribed about the elliptical container.

The above and other objects of the present invention will appear more fully from the following more detailed description and by reference to the accompanying drawing forming a part hereof, wherein is shown, by way of example, a satisfactory commercial embodiment of the invention and wherein Fig. 1 is a plan view of a roasting pan with a portion of the top thereof broken away;

Figure 1:
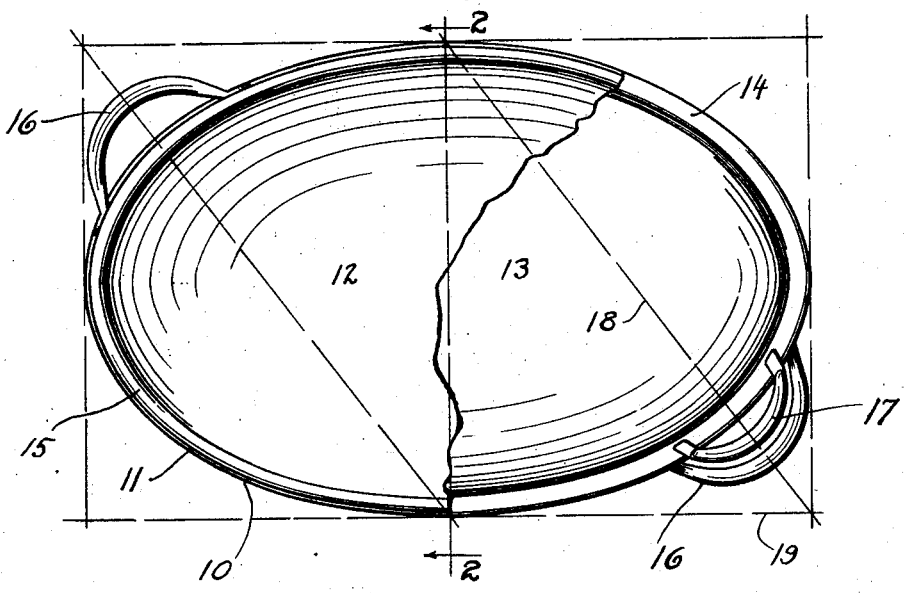
Figure 2:
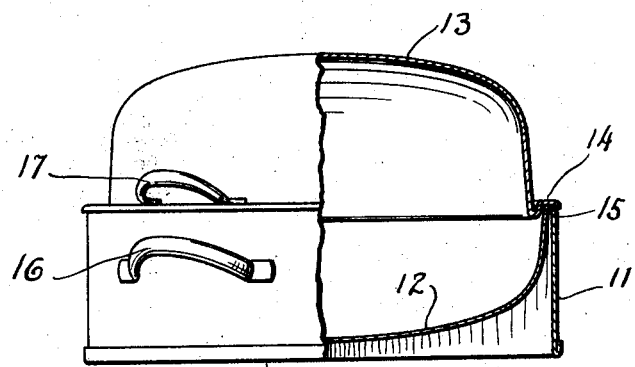
Fig. 2 is a view, partly in elevation and partly in section.
Figure 3:
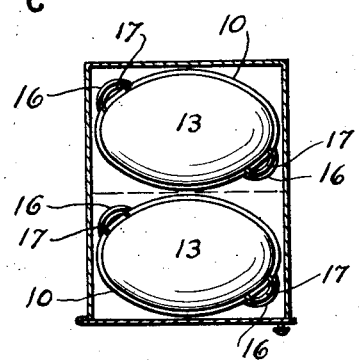
Fig. 3 is a plan view on a small scale, showing the manner in which a plurality of roasting pans constructed in accordance with the invention may be arranged within a comparatively small space within an oven, the walls of the oven being shown in section.

As shown in the drawing, the numeral 10 indicates the bottom or lower part of a roasting pan. This pan is shown in Fig. 1 and is of elliptical shape considering the same in any horizontal cross-sectional plane. A preferred construction of the lower part of the pan 10 includes an outer vertically extending flange or skirt 11 and a central portion 12 of generally ellipsoidal shape. The side edges of the ellipsoidal central portion 12 are, as shown in Fig. 2, spaced inwardly from the depending skirt portion 11 and the bottom of the portion 12 is located slightly above the plane in which the lower edge of the skirt portion 11 terminates. As will be seen from Fig. 2 of the drawing, the relative arrangement of the skirt portion 11 and the ellipsoidal portion 12 of the bottom 10 is such that a heat retaining chamber is formed between the skirt 11 and the portion 12 in order to obtain the highest possible fuel efficiency.

The cover 13 of the device is of the same general shape as the portion 12 of the bottom 10 thereof, and said cover is provided at its lower edge with a peripheral recessed flange 14 which fits over the bent upper peripheral edge 15 of the bottom 10.

The bottom and top members of the roaster, 10 and 13 respectively, are each provided with a pair of handles, 16 and 17. These handles, as will be noted from Fig. 1, are symmetrically disposed with respect to a line 18 which extends from the corner of a parallelepiped circumscribed about the roaster, and indicated by the reference character 19 in Fig. 1 of the drawing, to the end of the minor axis of an ellipse formed by the periphery of the container approximately in the horizontal plane in which the respective handle lies. The shape and size of the handles 16, 17, are such that the handles lie within the circumscribed parallelepiped 19. As a result of this particular arrangement of the handles the over-all dimensions of the roaster considered in the horizontal plane passing approximately through the handles, is no greater than that of the elliptical periphery of the device lying in the same plane, an, consequently, the roaster can be placed within a relatively small oven or, a plurality of the roasters may be arranged in closely juxtaposed relationship within a large oven, and will occupy much less space therein than were the handles placed on the sides or ends of the container at the ends of the major or minor axes of a horizontal cross-sectional ellipse thereof.

By reason of the generally elliptical shape of the roaster, a roast or fowl of much larger size may be placed therein and the over-all dimensions of the roaster are much less than those of a substantially rectangular one. The ellipsoidal shape of the bottom portion 12 insures that the contents of the roaster will gravitate naturally towards the center portion thereof so that the weight of such contents, or at least the center of gravity thereof, will lie relatively close to the center of the pan and between the lines 18. The arrangement of the handles 16 symmetrically with respect to the lines 18 also insures that when the pan is lifted there will be no tendency of the pan towards tilting in either direction upon either the major or minor axis of the device.

While I have shown the invention as applied to a roaster of the type that includes a skirt portion 11 about the bottom thereof and have illustrated the top 13 and circular portion 12 of the bottom as being of ellipsoidal configuration, it will be understood that the invention is not limited to these particular details but that the invention primarily relates to the combination in the device of the character described of handles arranged as described with a roaster or the like which is elliptical in horizontal cross-section.

As will be seen from the foregoing description and the drawing, the invention enables a roasting pan of much larger capacity to be accommodated within a small oven than would be possible with a pan of the constructions heretofore usually employed. In addition, the arrangement of the handles, as disclosed, insures that one of the handles will be located on the forward side of the oven well away from the side walls thereof, and in position to be grasped directly from the front end of the oven, thereby obviating the danger to a person, withdrawing the pan, or placing it within the oven, of touching the hands against the hot side walls of the oven and being severely burned. This advantage is most important when the dimensions of the oven, as is usually the case, are such that the pan must be placed with its major axis parallel to the rear wall of the oven.

I claim:

1. In a roasting pan, or the like, having a horizontal cross-section of generally elliptical configuration, a pair of handles secured upon opposite sides thereof and lying within the confines of a circumscribed parallelepiped, the sides of which are tangent to the ellipse at the major and minor axes thereof.

2. In a roasting pan, or the like, having a horizontal cross section of generally elliptical pairs of handles attached to the elliptical periphery thereof in diametrically opposed relationship and displaced laterally from the major and minor axes of the ellipse so as not to be intersected by such axes.

In testimony whereof I affix my signature hereto.

WALTER H. RUDOLPH.